US012327664B2

(12) United States Patent
Han et al.

(10) Patent No.: US 12,327,664 B2
(45) Date of Patent: Jun. 10, 2025

(54) OXIDE THIN FILM

(71) Applicant: VANAM INC., Seoul (KR)

(72) Inventors: Soo Deok Han, Seoul (KR); Won Young Choi, Seoul (KR)

(73) Assignee: VANAM INC., Seoul (KR)

( * ) Notice: Subject to any disclaimer, the term of this patent is extended or adjusted under 35 U.S.C. 154(b) by 0 days.

(21) Appl. No.: 18/963,901

(22) Filed: Nov. 29, 2024

(65) Prior Publication Data

US 2025/0095886 A1 Mar. 20, 2025

Related U.S. Application Data

(63) Continuation of application No. PCT/KR2023/017695, filed on Nov. 6, 2023.

(30) Foreign Application Priority Data

Nov. 5, 2022 (KR) ........................ 10-2022-0146598
Nov. 6, 2023 (KR) ........................ 10-2023-0151910

(51) Int. Cl.
*H01C 7/00* (2006.01)
*H01C 7/108* (2006.01)
(Continued)

(52) U.S. Cl.
CPC ............. *H01C 7/006* (2013.01); *H01C 17/08* (2013.01); *H01C 17/12* (2013.01); *H01C 7/008* (2013.01); *H01C 7/108* (2013.01)

(58) Field of Classification Search
CPC ........ H01C 7/006; H01C 7/008; H01C 7/108; H01C 17/08; H01C 17/12
See application file for complete search history.

(56) References Cited

U.S. PATENT DOCUMENTS 5,633,035 A 5/1997 Baba et al.
6,489,613 B1 * 12/2002 Mori ......................... G01J 5/20 250/338.4

(Continued)

FOREIGN PATENT DOCUMENTS

JP 07-105282 11/1995
JP 2015-068687 4/2015

(Continued)

OTHER PUBLICATIONS

International Search Report issued on Feb. 22, 2024, in International Application No. PCT/KR2023/017695.

(Continued)

*Primary Examiner* — Kyung S Lee
(74) *Attorney, Agent, or Firm* — PnK IP LLC

(57) ABSTRACT

The present technology relates to an oxide thin film. The oxide thin film of the present technology may include a single crystal substrate; and a main oxide layer laminated on the single crystal substrate and doped with dissimilar metal elements, wherein in energy-dispersive X-ray spectroscopy (EDX) using a transmission electron microscope (TEM), the dissimilar metal elements and metal elements of a metal oxide constituting the main oxide layer may be uniformly distributed. The present technology may provide an oxide thin film showing MIT characteristics of improved reliability, sensitivity, accuracy, and reproducibility.

4 Claims, 8 Drawing Sheets

(51) Int. Cl.
*H01C 17/08* (2006.01)
*H01C 17/12* (2006.01)

(56) References Cited

U.S. PATENT DOCUMENTS

| | | | | |
|---|---|---|---|---|
| 6,943,660 | B2 * | 9/2005 | Bower | H01C 10/103 338/47 |
| 8,864,957 | B2 | 10/2014 | Ramanathan et al. | |
| 9,153,366 | B2 | 10/2015 | Hirose | |
| 9,627,490 | B1 * | 4/2017 | Eom | H01L 21/02565 |
| 2009/0206979 | A1 * | 8/2009 | Tepper | H01C 10/16 29/610.1 |

FOREIGN PATENT DOCUMENTS

| | | |
|---|---|---|
| JP | 2016-072548 | 5/2016 |
| KR | 10-2016-0014899 | 2/2016 |
| WO | 2012-133074 | 10/2012 |

OTHER PUBLICATIONS

Office Action dated Apr. 20, 2024 issued in the Korean Patent Application No. 10-2023-0151910.
Written Decision on Registration dated May 29, 2024, issued in Korean Patent Application No. 10-2023-0151910.
Kim. Study on Photothermally Controlled Current Switching of Electronic Devices Based on Vanadium Dioxide Thin Films. Pukyong National University. 2021.
Chae et al. Characteristics of W- and Ti-Doped VO2 Thin Film Prepared by Sol-Gel Method. Electrochemical and Solid-State Letters. 2008.
Jing Du et al. Significant changes in Phase-transition hysteresis for Ti-doped VO2 films prepared by polymer-assisted deposition. Sola Energy Materials & Solar Cells. 2011. pp. 469-475.

* cited by examiner

OXIDE THIN FILM

CROSS REFERENCE TO RELATED APPLICATIONS

This application is a Bypass Continuation of International Patent Application No. PCT/KR2023/017695, filed on Nov. 6, 2023, which claims priority from and the benefit of Korean Patent Application No. 10-2022-0146598, filed on Nov. 5, 2022, and Korean Patent Application No. 10-2023-0151910, filed on Nov. 6, 2023, each of which is hereby incorporated by reference for all purposes as if fully set forth herein.

BACKGROUND

Field

Embodiments of the invention relate generally to an oxide thin film, and more specifically, to an oxide thin film having MIT characteristics.

Discussion of the Background

With the advent of IoT (Internet of Things) era, almost all things have become electronic devices. Accordingly, various electronic components, such as transistor, diode, memory, sensor, capacitor, and the like, have been more high-powered and miniaturized, and a greater number of electronic components have been integrated into an electronic device.

Meanwhile, an electronic device including a greater number of electronic components having higher performance may be more vulnerable to abnormal internal and external stimulations, such as overheating, overcurrent, and overvoltage. In order to solve this problem, it may be considered that a surge protection module is integrated into the electronic device.

From this viewpoint, there has been an increased interest in semiconductor materials having the characteristics of metal-insulator transition (MIT), that is, insulator to metal transition, which is induced by external energy stimulation. Among them, vanadium dioxide ($VO_2$) has been known to have a phase transition at a temperature (about 67° C.) close to room temperature at ultrahigh speed (within femtosecond ($10^{-15}$)) (refer to patent document 1). The vanadium dioxide ($VO_2$) has a great potential for application to detection, switching, and particularly, surge protection application fields on the point that it reacts sensitively and quickly on various energies, such as heat, electricity, and light (refer to non-patent document 1).

In the case of single crystal bulk $VO_2$, its destruction occurs rapidly within a few cycles with being accompanied by structural deformation and distortion thereof during the phase transition, and thus there may be limitations to the use of the single crystal bulk $VO_2$ in the areas described above. Accordingly, for reliability, such as repeatability and stability, it is required to make a high-quality $VO_2$ thin film.

In order for the $VO_2$ thin film to have the characteristics of high sensitivity and high reliability, the $VO_2$ thin film is required to have a large electrical resistance difference (R1/R2) between a metallic phase and an insulating phase and to have a small hysteresis temperature difference (ΔT) that is a difference between a phase transition temperature in a heating process and a phase transition temperature in a cooling process.

The above information disclosed in this Background section is only for understanding of the background of the inventive concepts, and, therefore, it may contain information that does not constitute prior art.

SUMMARY

An embodiment of the present disclosure provides an oxide thin film showing MIT characteristics of improved reliability, sensitivity, accuracy, and reproducibility.

Additional features of the inventive concepts will be set forth in the description which follows, and in part will be apparent from the description, or may be learned by practice of the inventive concepts.

An oxide thin film according to an embodiment may include: a single crystal substrate; and a main oxide layer laminated on the single crystal substrate and doped with dissimilar metal elements, wherein in energy-dispersive X-ray spectroscopy (EDX) using a transmission electron microscope (TEM), the dissimilar metal elements and metal elements of a metal oxide constituting the main oxide layer may be uniformly distributed.

An EDX curve distribution level of the dissimilar metal elements may have a difference of less than or equal to 30% compared to an EDX curve distribution level of the metal elements of the metal oxide constituting the main oxide layer.

An EDX curve standard deviation of the dissimilar metal elements that is measured in a thickness direction of the main oxide layer may have a difference of less than or equal to 30% compared to an EDX curve standard deviation of the metal elements of the metal oxide constituting the main oxide layer.

The main oxide layer may be formed by integrating a crystal sacrificial layer of the dissimilar metal elements and a preliminary oxide thin film formed on the crystal sacrificial layer through a post heat treatment process.

The crystal sacrificial layer may be grown on the single crystal substrate in a crystal orientation of the single crystal substrate.

The preliminary oxide thin film may be an amorphous film on the crystal sacrificial layer.

The main oxide layer may be the amorphous preliminary oxide thin film crystallized in a specified direction along a crystal orientation of the crystal sacrificial layer through the post heat treatment process.

The single crystal substrate may be a sapphire ($Al_2O_3$) single crystal substrate, and the main oxide layer may be formed by replacing (doping) at least some of V ions of a $VO_2$ crystal lattice with Ti ions.

Further, an oxide thin film according to an embodiment may include: a single crystal substrate; and a $VO_2$ layer laminated on the single crystal substrate and doped with Ti, wherein a $VO_2$ XRD peak of the $VO_2$ layer may not appear in a range of 2θ=20° to 60°, but may appear only in a range of 2θ=60° to 70°.

The $VO_2$ layer may not be defined as a poly-crystal thin film in which multiple main $VO_2$ XRD peaks that satisfy more than a predetermined intensity appear in a range of 2θ=20° to 70°, but may be defined as a high-crystal epitaxial thin film in which one main $VO_2$ XRD peak appears.

The poly-crystal thin film may be made so that the main $VO_2$ XRD peak appears in two or more of a range of 2θ=27.84±0.5°, a range of 2θ=33.4±0.5°, a range of 2θ=37.08±0.5°, a range of 2θ=42.26±0.5°, a range of 2θ=49.52±0.5°, a range of 2θ=55.54±0.5°, a range of 2θ=57.64±0.5°, and a range of 2θ=64.94±0.5°, whereas the epitaxial thin film may be made so that the main $VO_2$ XRD peak appears only in a range of θ=64.92±0.5°.

A half width at half maximum (HWHM) of the main $VO_2$ XRD peak of the $VO_2$ layer may be less than or equal to 1°.

The present technology may provide an oxide thin film showing the MIT characteristics of improved reliability, sensitivity, accuracy, and reproducibility.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
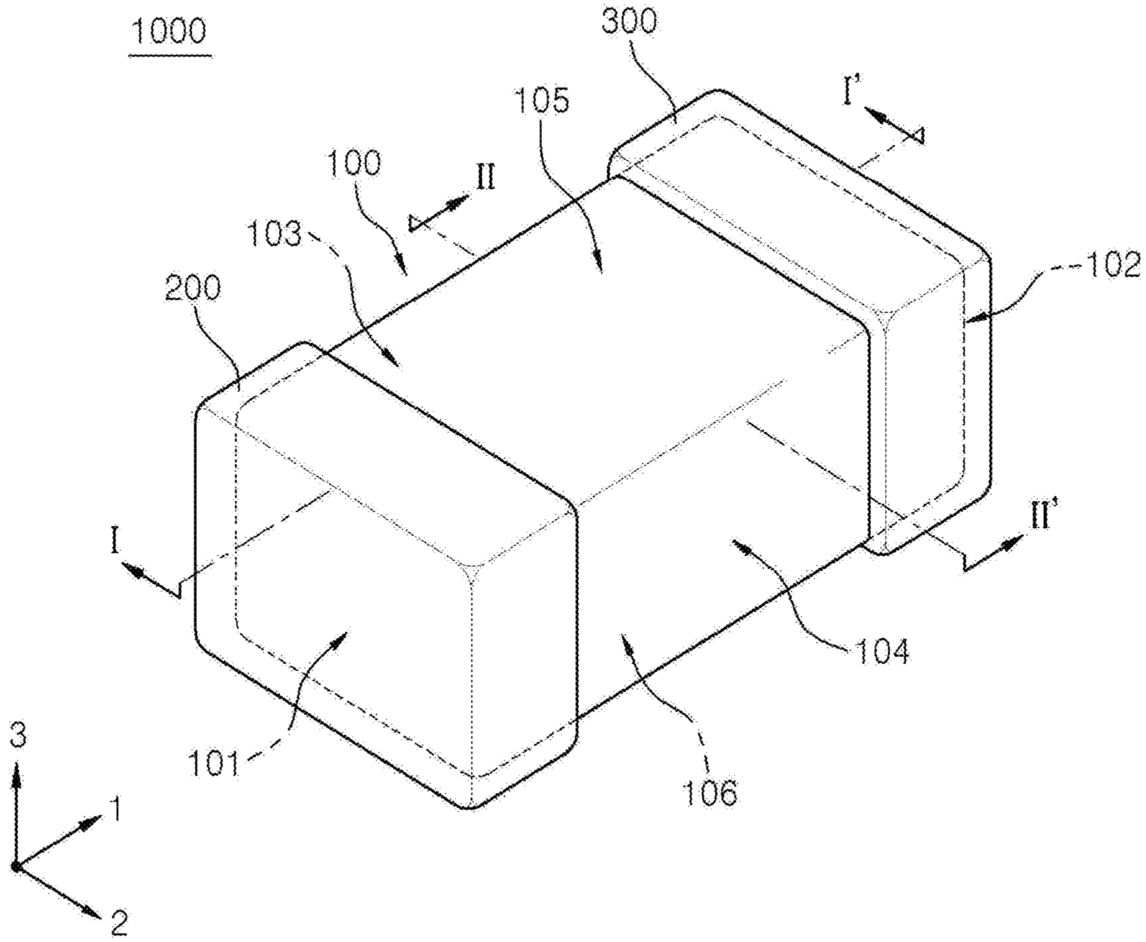
FIG. 1 is a view schematically representing an energy-sensitive electronic component according to an embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In the drawings, it may be defined that a first direction is an L direction or a length direction, a second direction is a W direction or a width direction, and a third direction is a T direction or a thickness direction.

Hereinafter, a thin film substrate and an energy-sensitive electronic component according to an embodiment of the present disclosure will be described in detail with reference to the accompanying drawings. In describing the present disclosure with reference to the accompanying drawings, the same reference numerals are used for the same or corresponding constituent elements, and the duplicate explanation thereof will be omitted.

Various types of electronic components are used in an electronic device, and for the purpose of preventing overheating or overvoltage, various types of energy-sensitive electronic components may be appropriately used among such electronic components. The energy-sensitive electronic component may be, for example, a thermistor that is a heat energy-sensitive electronic component or a varistor that is an electrical energy-sensitive electronic component, and may be used to protect various types of electronic devices, and various types of electronic components and various types of electronic component modules of the electronic device.

In the present specification, the energy-sensitive electronic component may mean an electronic component of which the electrical resistance is changed according to changes of energy, such as heat energy, electrical energy, or light energy. However, hereinafter, for the sake of simplicity, the following discussion will assume that the electrical resistance of the energy-sensitive electronic component changes according to the change of the heat energy, that is, according to the temperature change.

Figure 2:
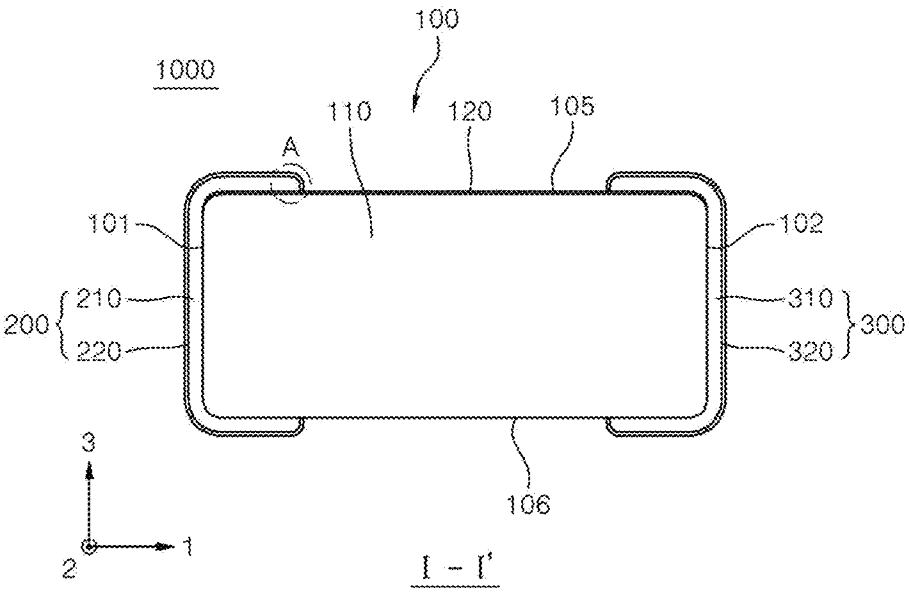
FIG. 2 is a view representing a cross section taken along line I-I' of FIG. 1.
Figure 3:
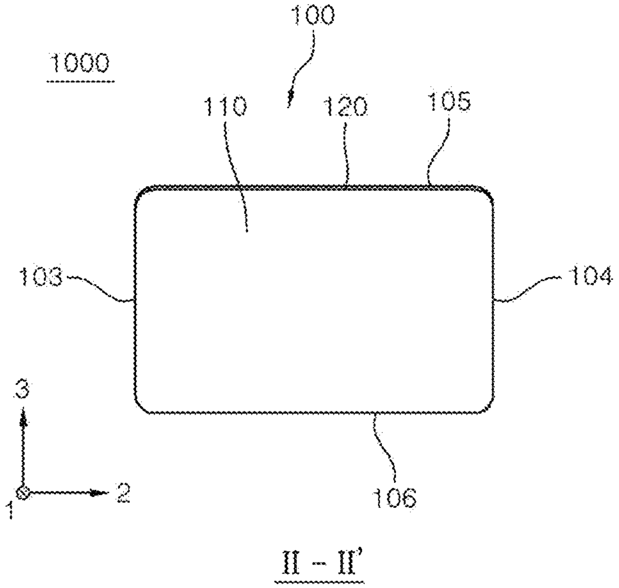
FIG. 3 is a view representing a cross section taken along line II-II' of FIG. 1.
Figure 4:
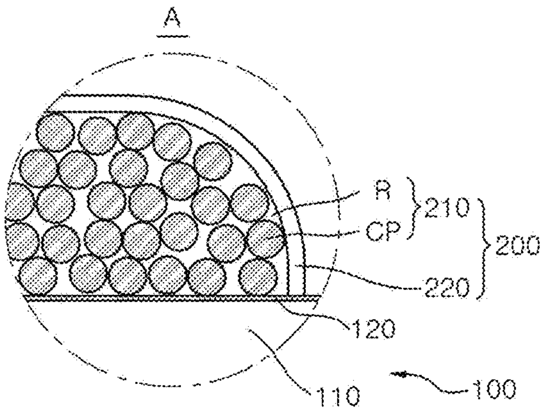
FIG. 4 is a view illustrating A of FIG. 2 in an enlarged manner.

FIG. 1 is a view schematically representing an energy-sensitive electronic component according to an embodiment of the present disclosure. FIG. 2 is a view representing a cross section taken along line I-I' of FIG. 1. FIG. 3 is a view representing a cross section taken along line II-II' of FIG. 1. FIG. 4 is a view illustrating A of FIG. 2 in an enlarged manner.

Referring to FIGS. 1 to 4, an electronic component 1000 according to an embodiment includes a thin film substrate 100, a first external electrode 200, and a second external electrode 300. The thin film substrate 100 includes a base substrate 110 and a functional thin film 120. Hereinafter, for convenience in explanation, "energy-sensitive electronic component 1000" is referred to as "electronic component 1000".

The thin film substrate 100 may form the overall appearance of the electronic component 1000 according to the present embodiment. The thin film substrate 100 may be formed in an overall hexahedral shape. Hereinafter, the thin film substrate 100 is referred to as a body 100 on the point that the thin film substrate 100 forms the overall appearance of the electronic component 1000.

Based on FIGS. 1 to 3, the body 100 includes a first surface 101 and a second surface 102 facing each other in a first direction 1, a third surface 103 and a fourth surface 104 facing each other in a second direction 2, and a fifth surface 105 and a sixth surface 106 facing each other in a third direction 3. Each of the first to fourth surfaces 101, 102, 103, and 104 of the body 100 corresponds to a wall surface of the body 100 connecting the fifth surface 105 and the sixth surface 106 of the body 100 with each other. Hereinafter, both end surfaces (one end surface and the other end surface) of the body 100 may mean the first surface 101 and the second surface 102 of the body 100, both side surfaces (one side surface and the other side surface) of the body 100 may mean the third surface 103 and the fourth surface 104 of the body 100, and one surface and the other surface of the body 100 may mean the sixth surface 106 and the fifth surface 105 of the body 100, respectively. Meanwhile, the body 100 includes the base substrate 110 and the functional thin film 120 disposed on the base substrate 110, and thus each of the first to fourth surfaces 101, 102, 103, and 104 of the body 100 may be composed of the base substrate 100 and the functional thin film 120. Further, the sixth surface 106 of the body 100 may be substantially composed of only the base substrate 100, and the fifth surface 105 of the body 100 may be substantially composed of only the functional thin film 120. In mounting the electronic component 1000 according to the present embodiment on a mounting board such as a printed circuit board, the sixth surface 106 of the body 100 may be mounted to be directed toward the upper surface of the mounting board, or the fifth surface 105 of the body 100 may be mounted to be directed toward the upper surface of the mounting board.

For example, the body 100 may be formed so that the electronic component 100 of the present embodiment, on which external electrodes 200 and 300 to be described later are formed, has a length of 7.4 mm and a width of 5.1 mm, has a length of 6.3 mm and a width of 3.2 mm, has a length of 5.0 mm and a width of 2.5 mm, has a length of 4.5 mm and a width of 3.2 mm, has a length of 4.5 mm and a width of 1.6 mm, has a length of 3.2 mm and a width of 2.5 mm, has a length of 3.2 mm and a width of 1.6 mm, has a length of 2.5 mm and a width of 2.0 mm, has a length of 2.0 mm and a width of 1.2 mm, has a length of 1.6 mm and a width of 0.8 mm, has a length of 1.0 mm and a width of 0.5 mm, has a length of 0.8 mm and a width of 0.4 mm, has a length of 0.6 mm and a width of 0.3 mm, or has a length of 0.4 mm and a width of 0.2 mm, but the length and the width of the electronic component 1000 are not limited thereto. Meanwhile, since the above-described exemplary dimensions of the length and the width of the electronic component 1000 are dimensions in which a process error is not reflected, the dimensions of the process error range that may be recognized as the process error should be viewed to correspond to the above-described exemplary dimensions. In addition, since the body 100 of the electronic component 1000 may be formed by dicing the base substrate 110 in a wafer state after forming the functional thin film 120 on the base substrate 110 in the wafer state, the length and the width of the electronic component 1000 may be substantially the same as the length and the width of the base substrate 110 and the length and the width of the functional thin film 120.

Here, the length of the electronic component 1000 may mean a maximum value among dimensions according to the first direction 1 of each of a plurality of line segments that are parallel to the first direction 1 in a state where two boundary lines facing in the first direction 1 are connected, among outermost boundary lines of the electronic component 1000 shown in an optical microscope photograph or an SEM photograph, based on the photograph for the cross sections (cross sections 1 to 3) of the electronic component 1000 taken from a central part in the second direction 2 of the electronic component 1000 to the first direction 1 to the third direction 3. Alternatively, the length of the electronic component 1000 may mean a minimum value among the dimensions according to the first direction 1 of each of the plurality of line segments that are parallel to the first direction 1 in a state where two boundary lines facing in the first direction 1 are connected, among the outermost boundary lines of the electronic component 1000 shown in the photo. Alternatively, the length of the electronic component 1000 may mean an arithmetic mean value of the dimensions according to the first direction 1 of at least two of the plurality of line segments that are parallel to the first direction 1 in a state where two boundary lines facing in the first direction 1 are connected, among the outermost boundary lines of the electronic component 1000 shown in the photograph.

Here, the width of the electronic component 1000 may mean a maximum value among dimensions according to the second direction 2 of each of the plurality of line segments that are parallel to the second direction 2 in a state where two boundary lines facing in the second direction 2 are connected, among the outermost boundary lines of the electronic component 1000 shown in the optical microscope photograph or the SEM photograph, based on the cross section photo for the cross sections (cross sections 1-2) of the electronic component 1000 taken from the central part in the third direction 3 of the electronic component 1000 to the first direction 1 to the second direction 2. Alternatively, the width of the electronic component 1000 may mean a minimum value among the dimensions according to the second direction 2 of each of the plurality of line segments that are parallel to the second direction 2 in a state where two boundary lines facing in the second direction 2 are connected, among the outermost boundary lines of the electronic component 1000 shown in the cross section photograph. Alternatively, the width of the electronic component 1000 may mean an arithmetic mean value of the dimensions according to the second direction 2 of at least two of the plurality of line segments that are parallel to the second direction 2 in a state where two boundary lines facing in the second direction 2 are connected, among the outermost boundary lines of the electronic component 1000 shown in the cross section photo.

Here, the thickness of the electronic component 1000 may mean a maximum value among dimensions according to the third direction 3 of each of a plurality of line segments that are parallel to the third direction 3 in a state where two boundary lines facing in the third direction 3 are connected among outermost boundary lines of the electronic component 1000 shown in an optical microscope photo or a SEM photo, based on the cross section photo for the cross sections (cross sections 1-3) of the electronic component 1000 taken from a central part in the second direction 2 of the electronic component 1000 to the first direction 1 to the third direction 3. Alternatively, the thickness of the electronic component 1000 may mean a minimum value among the dimensions according to the third direction 3 of each of the plurality of line segments that are parallel to the third direction 3 in a state where two boundary lines facing in the third direction 3 are connected, among the outermost boundary lines of the electronic component 1000 shown in the cross section photograph. Alternatively, the width of the electronic component 1000 may mean an arithmetic mean value of the dimensions according to the third direction 3 of at least two of the plurality of line segments that are parallel to the third direction 3 in a state where two boundary lines facing in the third direction 3 are connected, among the outermost boundary lines of the electronic component 1000 shown in the cross section photograph.

Alternatively, the length, width, or thickness of the electronic components 1000 may be measured by a micrometer measurement method. The micrometer measurement method may measure the length, width, or thickness of the electronic component 1000 by turning a measurement lever of a micrometer in a state where the zero point is set by the micrometer with gage R&R (repeatability and reproducibility), and the electronic component 100 according to the present embodiment is inserted between tips of the micrometer. Meanwhile, in measuring the length of the electronic component 1000 through the micrometer measurement method, the length of the electronic component 1000 may mean a value once measured or an arithmetic mean value of values measured plural times. This may be equally applied even to the width and the thickness of the electronic component 1000.

The body 100 includes the base substrate 110 and the functional thin film 120. Specifically, the body 100 includes the base substrate 110 and the functional thin film 120 disposed on one surface of the base substrate 110 (upper surface of the base substrate 110 based on the directions of FIGS. 1 to 3).

The base substrate 110 may be a single crystal substrate. The base substrate 110 may grow in one direction and become crystalline. As an example, the base substrate 110 may be an $Al_2O_3$ single crystal substrate, Si single crystal substrate, SiC single crystal substrate, Ge single crystal substrate, $TiO_2$ single crystal substrate, ZnO single crystal substrate, ZnS single crystal substrate, ZnSe single crystal substrate, ZnTe single crystal substrate, CdS single crystal substrate, CdSe single crystal substrate, CdTe single crystal substrate, GaAs single crystal substrate, GaP single crystal substrate, GaSb single crystal substrate, InAs single crystal substrate, InP single crystal substrate, $SrTiO_3$ single crystal substrate, or MgO single crystal substrate.

The functional thin film 120 may be a $VO_2$ thin film doped with Ti.

As a non-limiting example, the functional thin film 120 may be formed on the base substrate 110 by forming a $TiO_2$ sacrificial layer on the base substrate 110, forming a $VO_2$ main oxide thin film layer on the sacrificial layer, and performing post heat treatment of the sacrificial layer and the main oxide thin film layer.

Here, the sacrificial layer may be grown on the upper surface of the base substrate 110 in a predetermined direction along a crystal orientation of the base substrate 110. That is, the sacrificial layer may be precrystallized prior to forming the main oxide thin film layer. The thickness of the sacrificial layer may be, for example, 1 nm to 50 nm, but the scope of the present disclosure is not limited thereto, and the thickness of the sacrificial layer may be appropriately varied depending on the Ti ion concentration on the designed functional thin film 120. The sacrificial layer may be formed through a thin film process such as, for example, physical vapor deposition (PECVD) such as sputtering, pulse laser deposition (PLD), and e-beam evaporation, chemical vapor deposition (PECVD or MOCVD), atomic layer deposition (ALD), and molecular beam epitaxy (MBE).

Here, the main oxide thin film layer may be crystallized in a predetermined direction according to the crystal orientation of the sacrificial layer, or may become amorphous. In case that the post heat treatment process follows after the main oxide thin film is formed, the main oxide thin film layer may be formed on the sacrificial layer in an amorphous state. The thickness of the main oxide thin film layer may be, for example, 10 nm to 1000 nm, but the scope of the present disclosure is not limited thereto, and the thickness of the main oxide thin film layer may be appropriately varied depending on the Ti ion concentration on the designed functional thin film 120. The main oxide thin film layer may be formed through a thin film process such as, for example, physical vapor deposition (PECVD) such as sputtering, pulse laser deposition (PLD), and e-beam evaporation, chemical vapor deposition (PECVD or MOCVD), atomic layer deposition (ALD), and molecular beam epitaxy (MBE).

Here, the post heat treatment may be a process for integrating the sacrificial layer and the main oxide thin film layer. Specifically, the post heat treatment may be an integration process to remove boundaries between the sacrificial layer and the main oxide thin film layer by doping of a material that makes the sacrificial layer into the main oxide thin film layer. The post heat treatment may be performed, for example, by using equipment such as a box furnace, a tube furnace, or a rapid thermal annealing furnace (RTA). The post heat treatment may be performed, for example, at an atmosphere of one or more of air, oxygen ($O_2$), nitrogen ($N_2$), argon (Ar), and hydrogen ($H_2$). The post heat treatment may be performed, for example, at a temperature range of 400° C. to 800° C. This is a method in which a main oxide layer is deposited at a low temperature and then is post-heat-treated, and this method benefits vacuum equipment chamber configuration, and is advantageous in thin film reproducibility through reduction of variables due to the temperature during the deposition.

The crystal structure and orientation of the functional thin film 120 that is formed through the post heat treatment process may be determined, for example, according to the crystal structure and orientation of the sacrificial layer. For example, the functional thin film 120 that becomes integrated by post-heat-treating the sacrificial layer and the main oxide thin film layer may be crystallized in a predetermined direction according to the crystal orientation of the sacrificial layer before the post heat treatment. In this case, the crystal orientations of the functional thin film 120 and the sacrificial layer may not necessarily be the same. For example, the functional thin film 120 may have a crystal lattice spacing that is substantially the same as that of the sacrificial layer, but may be crystallized through being grown in a direction different from the direction of the crystal sacrificial layer. Further, since the metal ionic radius of the sacrificial layer is similar to the metal ionic radius of the main oxide thin film layer ($Ti^{4+}$ ionic radius is 0.60 Å, and $V^{4+}$ ionic radius is 0.58 Å), the metal ions of the sacrificial layer may be able to self-spread without substantially changing the $VO_2$ crystal structure during the post heat treatment process.

That is, the sacrificial layer and the main oxide layer may have a crystal lattice difference of 1% or less at a junction surface thereof, and a difference in metal ionic radius between the sacrificial layer and the main oxide layer may be 5% or less, and this is for the metal ions to be able to self-spread without changing the crystal structure during the post heat treatment process.

If it is assumed that the resistance of the functional thin film 120 at 25° C. is R1 and the resistance thereof at 80° C. is R2, R1/R2 of the functional thin film 120 may be more than or equal to 104. The R1/R2 of the functional thin film 120 may be, for example, 17000 or more. By implanting the R1/R2 of the functional thin film 120 more than equal to 104, the electronic component 1000 according to the present embodiment may detect more sensitively the energy change at a temperature in the range of 25° C. to 80° C.

If it is assumed that a heating process from 25° C. to 80° C. and a cooling process from 80° C. to 25° C. constitute one cycle, the functional thin film 120 may satisfy at least one of a) a change ($V_{\Delta T}$) of a hysteresis temperature difference ($\Delta T$) is less than or equal to 1° C. for 10 cycles, b) a change ($V_{TMI}$) of a phase transition temperature ($T_{MI}$) is less than or equal to 1.5° C. for 10 cycles, and c) a change rate ($V_{R1/R2}$) of R1/R2 is less than or equal to 5% for 10 cycles.

Here, if it is assumed that, based on any one cycle, the temperature when an absolute value of a temperature coefficient of resistance (TCR) of the functional thin film 120 that is defined by Equation 1 below in the heating process is maximum is TH, and the temperature when the absolute value of the temperature coefficient of resistance (TCR) of the functional thin film 120 that is defined by Equation 1 below in the cooling process is maximum is TC, the hysteresis temperature difference ($\Delta T$) of the functional thin film 120 may mean a difference between $T_H$ and TC. The hysteresis temperature difference ($\Delta T$) of the functional thin film 120 may be less than or equal to 1° C., and for example, may be less than or equal to 0.726° C. If the hysteresis temperature difference ($\Delta T$) of the functional thin film 120 is less than or equal to 1° C., it may be seen that there is substantially no thermal hysteresis during the corresponding cycle. As a result, for the functional thin film 120, the temperature in the heating process may be substantially the same as the temperature in the cooling process with respect to the same resistance within the temperature range of the heating and cooling processes. Accordingly, unlike the conventional electronic component in which the temperature varies depending on the heating process or the cooling process even if the resistance is the same, the electronic component 1000 according to the present embodiment can detect the energy change relatively accurately.

$$TCR(/° C.) = -(1/R) = (dR/dT) \quad \text{[Equation 1]}$$

Further, for example, in case of performing the heating process and the cooling process from the first cycle to the tenth cycle with respect to the functional thin film 120, the change ($V_{\Delta T}$) in hysteresis temperature difference ($\Delta T$) for 10 cycles of the functional thin film 120 may mean a difference between the maximum value and the minimum value of the hysteresis temperature differences ($\Delta T1$, $\Delta T2$, . . . , $\Delta T10$) of the functional thin film 120 obtained in the first to tenth cycles ($V_{\Delta T}=|\mathrm{Max}(\Delta T1, \Delta T2, \ldots, \Delta T10)-\mathrm{Min}(\Delta T1, \Delta T2, \ldots, \Delta T10)|$). Alternatively, for example, in case of performing the heating process and the cooling process from the first cycle to the tenth cycle with respect to the functional thin film 120, the change ($V_{\Delta T}$) in hysteresis temperature difference ($\Delta T$) for 10 cycles of the functional thin film 120 may mean a difference between the hysteresis temperature difference ($\Delta T1$) of the functional thin film 120 in the first cycle and the hysteresis temperature difference ($\Delta T10$) of the functional thin film 120 in the tenth cycle ($V_{\Delta T}=|\Delta T1-\Delta T10|$). If the change ($V_{\Delta T}$) in hysteresis temperature difference ($\Delta T$) for 10 cycles of the functional thin film 120 is less than or equal to 1° C., it may be seen that the functional thin film 120 has a substantially constant hysteresis temperature difference ($\Delta T$) even if the cycle increases. As a result, the functional thin film 120 can detect an accurate energy change repeatedly and stably within the temperature range of the heating and cooling processes. Accordingly, the electronic component 1000 of the present embodiment may have improved repeatability for accuracy.

Here, the phase transition temperature ($T_{MI}$) of the functional thin film 120 may be defined by Equation 2 below. That is, the phase transition temperature ($T_{MI}$) of the functional thin film 120 may mean a half of the difference between $T_H$ and $T_C$ in any one cycle. The phase transition temperature ($T_{MI}$) of the functional thin film 120 may be less than or equal to 54° C., and for example, may be 52.4° C., 53.1° C., or 53.5° C., but the scope of the present disclosure is not limited thereto. Specifically, the phase transition temperature ($T_{MI}$) of the functional thin film 120 may be varied by the content of Ti ions doped into the functional thin film 120. If the phase transition temperature ($T_{MI}$) of the functional thin film 120 is less than or equal to 54° C., metal-insulator transition (MIT) phenomenon may be used in a relatively low temperature area. Accordingly, the electronic component 1000 according to the present embodiment may be used as a switching component in a relatively low temperature area.

$$T_{MI}(° C.) = |T_H - T_C|/2 \quad \text{[Equation 2]}$$

Further, for example, in case of performing the heating process and the cooling process from the first cycle to the tenth cycle with respect to the functional thin film 120, the change ($V_{TMI}$) in phase transition temperature ($T_{MI}$) for 10 cycles of the functional thin film 120 may mean a difference between the maximum value and the minimum value of the phase transition temperatures ($T_{MI1}$, $T_{MI2}$, . . . , $T_{MI10}$) of the functional thin film 120 obtained in the first to tenth cycles ($V_{TMI}=|\mathrm{Max}(T_{MI1}, T_{MI2}, \ldots, T_{MI10})-\mathrm{Min}(T_{MI1}, T_{MI2}, \ldots, T_{MI10})|$. Alternatively, for example, in case of performing the heating process and the cooling process from the first cycle to the tenth cycle with respect to the functional thin film 120, the change ($V_{TMI}$) in phase transition temperature ($T_{MI}$) for 10 cycles of the functional thin film 120 may mean a difference between the phase transition temperature ($T_{MI1}$) of the functional thin film 120 in the first cycle and the phase transition temperature ($T_{MI10}$) of the functional thin film 120 in the tenth cycle ($V_{TMI}=|T_{MI1}-T_{MI10}|$). If the change ($V_{TMI}$) in phase transition temperature ($T_{MI}$) for 10 cycles of the functional thin film 120 is less than or equal to 1.5° C., it may be seen that the functional thin film 120 has a substantially constant phase transition temperature ($T_{MI}$) even if the cycle increases. As a result, the functional thin film 120 can implement the switching function repeatedly and stably within the temperature range of the heating and cooling processes. Accordingly, the electronic component 1000 according to the present embodiment may be repeatedly used as a switching component regardless of the number of operations in a relatively low temperature area.

Here, for example, in case of performing the heating process and the cooling process from the first cycle to the tenth cycle with respect to the functional thin film 120, the change rate ($V_{R1/R2}$) of R1/R2 for 10 cycles of the functional thin film 120 may mean a percentage of a value obtained by dividing a difference between the maximum value and the minimum value of R1/R2 values ($(R1/R2)_1$, $(R1/R2)_2$ . . . , $(R1/R2)_{10}$) of the functional thin film 120, which are obtained in the first cycle to the tenth cycle, respectively, by the maximum value ($V_{R1/R2}=100*(|\mathrm{Max}((R1/R2)_1, (R1/R2)_2 \ldots, (R1/R2)_{10})-\mathrm{Min}((R1/R2)_1, (R1/R2)_2 \ldots, (R1/R2)_{10}))/\mathrm{Max}(R1/R2)_1, (R1/R2)_2 \ldots, (R1/R2)_{10})$. Alternatively, for example, in case of performing the heating process and the cooling process from the first cycle to the tenth cycle with respect to the functional thin film 120, the change rate ($V_{R1/R2}$) of R1/R2 for 10 cycles of the functional thin film 120 may mean a percentage of a difference between the R1/R2 value ($(R1/R2)_1$) of the functional thin film 120 in the first cycle and the R1/R2 value ($(R1/R2)_{10}$) of the functional thin film 120 in the tenth cycle to the R1/R2 value ($(R1/R2)_1$) of the functional thin film 120 in the first cycle ($V_{R1/R2}=100*(|(R1/R2)_1-(R1/R2)_{10}|)/(R1/R2)_1$). If the change rate ($V_{R1/R2}$) of R1/R2 for 10 cycles of the functional thin film 120 is about less than or equal to 5%, it may be seen that the functional thin film 120 has a substantially constant value of R1/R2 even if the cycle increases. As a result, the functional thin film 120 may detect a sensitive energy change repeatedly and stably within the temperature range of the heating and cooling processes. Accordingly, the electronic component 1000 according to the present embodiment can have improved repeatability for sensitivity.

The external electrodes 200 and 300 are disposed to be spaced apart from each other on the body 100. That is, the external electrodes 200 and 300 are disposed in the form of being spaced apart from each other on the base substrate 110 and/or the functional thin film 120. Each of the external electrodes 200 and 300 is connected to come in contact with the functional thin film 120. The external electrodes 200 and 300 may be formed by at least one of vapor deposition such as sputtering, plating, and conductive paste applying and curing. The external electrodes 200 and 300 may include a conductive material, such as platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), cobalt (Co), or an alloy thereof. The external electrodes 200 and 300 may be formed in a single or double layer structure.

The external electrodes 200 and 300 include conductive resin layers 210 and 310 and metal layers 220 and 320 formed on the conductive resin layers 210 and 310, respectively. Specifically, the first external electrode 200 includes the first conductive resin layer 210 formed on the body 100 and a first metal layer 220 formed on the first conductive resin layer 210. The second external electrode 300 includes the second conductive resin layer 310 formed on the body 100 and the second metal layer 320.

The first conductive resin layer 210 is disposed on the first surface 101 of the body 100, and is extended to at least a portion of each of the third to sixth surfaces 103, 104, 105, and 106 of the body 100. The first conductive resin layer 210 comes in contact with one end portion on the first surface 101 side of the body 100 of the functional thin film 120. The second conductive resin layer 310 is disposed on the second surface 102 of the body 100, and is extended to at least a portion of each of the third to sixth surfaces 103, 104, 105, and 106 of the body 100. The second conductive resin layer 310 comes in contact with the other end portion on the second surface 102 side of the body 100 of the functional thin film 120. The first and second conductive resin layers 210 and 310 are disposed to be spaced apart from each other on the third to sixth surfaces 103, 104, 105, and 106 of the body 100. Meanwhile, in FIGS. 1 to 3, each of the conductive resin layers 210 and 310 is illustrated so as to be formed on five surfaces of the body 100 as a normal type, but this is merely exemplary. That is, depending on the design, each of the conductive resin layers 210 and 310 may be transformed into one of a C type (e.g., in which the first conductive resin layer 210 is disposed only on the first surface 101, the fifth surface 105, and the sixth surface 106), an L type (e.g., in which the first conductive resin layer 210 is disposed only on the first surface 101 and the fifth surface 105 of the body 100, or is disposed only on the first surface 101 and the sixth surface 106 of the body 100), and a lower electrode type (e.g., in which the first conductive resin layer 210 is disposed only on the fifth surface 105 of the body 100).

Each of the conductive resin layers 210 and 310 includes a base resin R and conductive particles CP dispersed in the base resin R. The conductive particles CP may come in contact with each other in the base resin R, and may connect the external electrodes 200 and 300 and the functional thin film with each other. Each of the external electrodes 200 and 300 may be formed by applying conductive paste for forming the conductive resin layer onto the body 100 and then curing the conductive paste.

The base resin R may include a thermosetting resin having electrical insulation. The thermosetting resin may be, for example, an epoxy resin, but the present disclosure is not limited thereto.

The conductive particles CP may include at least one of platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co). As a non-limiting example, the conductive particles CP may include at least one of platinum (Pt) particles, gold (Au) particles, chromium (Cr) particles, molybdenum (Mo) particles, nickel (Ni) particles, titanium (Ti) particles, silver (Ag) particles, aluminum (Al) particles, copper (Cu) particles, iron (Fe) particles, indium (In) particles, tin (Sn) particles, lead (Pb) particles, palladium (Pd) particles, zinc (Zn) particles, cobalt (Co) particles, and alloy particles composed of at least two of the above metals. As another example, the conductive particles CP may have a core-shell structure. Here, the core may include at least one of platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co), and the shell may include at least another one of platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co).

The conductive particles CP may be of a spherical type and/or flake type. The flake type may mean that the dimension according to any one of first to third directions 1, 2, and 3 is more than equal to 1.5 times larger than the dimension according to another one of the first to third directions 1, 2, and 3. Here, the direction of the larger of the above-described two dimensions may be defined as the major axis, and the direction of the smaller of the above-described two dimensions may be defined as the minor axis.

The metal layers 220 and 320 may be formed on the conductive resin layers 210 and 310, respectively. At least a portion of each of the metal layers 220 and 320 is disposed in an area of the conductive resin layers 210 and 310 which is formed on a mounting surface of the electronic component 1000 according to the present embodiment.

As an example, if the mounting surface of the electronic component 1000 of the present embodiment is the fifth surface 105 side of the body 100, the first metal layer 220 may be formed in an area of the first conductive resin layer 210 disposed on the fifth surface 105 of the body 100, and the second metal layer 320 may be formed in an area of the second conductive resin layer 310 disposed on the fifth surface 105 of the body 100. In this case, the first metal layer 220 may be formed on at least a portion of the first surface 101, the third surface 103, the fourth surface 104, and the sixth surface 106 of the body 100. Alternatively, the first metal layer 220 may not be formed on at least some of the first surface 101, the third surface 103, the fourth surface 104, and the sixth surface 106 of the body 100 even if the first conductive resin layer 210 is formed to be extended to each of the first surface 101, the third surface 103, the fourth surface 104, and the sixth surface 106 of the body 100. In this case, the second metal layer 320 may be formed on at least a portion of the second surface 102, the third surface 103, the fourth surface 104 and the sixth surface of the body 100. Alternatively, the second metal layer 320 may not be formed on at least some of the second surface 102, the third surface 103, the fourth surface 104, and the sixth surface 106 of the body 100 even if the second conductive resin layer 310 is formed to be extended to each of the second surface 102, the third surface 103, the fourth surface 104, and the sixth surface 106 of the body 100.

As another example, if the mounting surface of the electronic component 1000 of the present embodiment is the sixth surface 106 side of the body 100, the first metal layer 220 may be formed in an area of the first conductive resin layer 210 disposed on the sixth surface 106 of the body 100, and the second metal layer 320 may be formed in an area of the second conductive resin layer 310 disposed on the sixth surface 106 of the body 100. In this case, the first metal layer 220 may be formed on at least a portion of the first surface 101 and the third to fifth surfaces 103, 104, and 105 of the body 100. Alternatively, the first metal layer 220 may not be formed on at least some of the first surface 101 and the third to fifth surfaces 103, 104, and 105 of the body 100 even if the first conductive resin layer 210 is formed to be extended to each of the first surface 101 and the third to fifth surfaces 103, 104, and 105 of the body 100. In this case, the second metal layer 320 may be formed on at least some of the second to fifth surfaces 102, 103, 104, and 105 of the body 100. Alternatively, the second metal layer 320 may not be formed on at least some of the second to fifth surfaces 102, 103, 104, and 105 of the body 100 even if the second conductive resin layer 310 is formed to be extended to each of the second to fifth surfaces 102, 103, 104, and 105 of the body 100.

Each of the metal layers 220 and 320 may include at least one of platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co).

Each of the metal layers 220 and 320 may be formed as a single layer or a double layer. Metal layers 220 and 320 may be formed by at least one of vapor deposition such as sputtering and plating. As a non-limiting example, the metal layers 220 and 320 may include first plating layers 221 and 321 formed on the conductive resin layers 210 and 310 and second plating layers 222 and 322 formed on the first plating layers 221 and 321, respectively. As a non-limiting example, the first plating layers 221 and 321 may be nickel plating layers, and the second plating layers 222 and 322 may be tin plating layers. Meanwhile, if the area in which the conductive resin layers 210 and 310 are formed is different from the area in which the metal layers 220 and 320 are formed on the first to sixth surfaces 101, 102, 103, 104, 105, and 106 of the body 100, as an example, a resist forming process for exposing only some of outer surfaces of the conductive resin layers 210 and 310 may be added between a process for forming the conductive resin layers 210 and 310 and a process of forming the metal layers 220 and 320.

EXPERIMENTAL EXAMPLES

Method for Manufacturing Experimental Examples 1 and 2

Experimental example 1 was manufactured by the following method. First, as a sacrificial layer, a $TiO_2$ thin film (with a thickness of 3 nm to 5 nm) was formed on a sapphire ($Al_2O_3$) single crystal substrate by sputtering. Next, as a main oxide thin film layer, a $VO_2$ thin film (with a thickness of 200 nm to 300 nm) was formed on the sacrificial layer by sputtering. In order to form the $VO_2$ thin film, deposition was performed by supplying an Ar gas with a process temperature of room temperature and a process pressure of 10~30 mtorr. Next, by performing post heat treatment of the sacrificial layer and the main oxide thin film layer at 400° C. to 800° C., a functional thin film, in which at least some of V ions of a $VO_2$ crystal lattice had been replaced (doped) with Ti ions, was produced. Hereinafter, the thin film (functional thin film) finally manufactured according to the Experimental example 1 is called a first thin film.

As compared to the Experimental example 1, Experimental example 2 was manufactured in the same method as the method of the Experimental example 1 except that the sacrificial layer of the Experimental example 1 is not deposited. That is, the Experimental example 2 was manufactured by directly forming a main oxide thin film layer ($VO_2$) on the sapphire ($Al_2O_3$) single crystal substrate used for the Experimental example 2 under the same condition as the main oxide thin film layer forming condition of the Experimental example 1, and then by performing post heat treatment of the main oxide thin film layer under the same condition as the post heat treatment condition of the Experimental example 1. Hereinafter, the thin film (post-heat-treated functional thin film) finally manufactured according to the Experimental example 2 is called a second thin film.

(Characteristic Evaluation of First and Second Thin Films for Thermal Cycles)

The resistance according to the temperature of the first and second thin films was measured while a thermal cycle that is composed of a heating process from 25° C. to 80° C. and a cooling process from 80° C. to 25° C. was performed multiple times with respect to the first and second thin films.

The heating and cooling of the first and second thin films was implemented by mounting a heater capable of generating heat on a lower part of the sapphire substrate on which the first and second thin films were formed and by adjusting the power that was applied to the heater. Specifically, the first and second thin films were heated by supplying the power to the heater at room temperature (25° C.), and when the temperature of the first and second thin films reaches 80° C., the first and second thin films were cooled by cutting off the power to the heater.

The surface temperature of the first and second thin films was measured by Nanovoltmeter (Model No. Keithley 2182A) of Keithley Instruments™ in a state where a contact temperature probe (k-type thermocouple; 0.005 inches thermocouple wire) of Omega Engineering™ is attached to the first and second thin films.

The electrical resistance of the first and second thin films was derived by applying a constant voltage to the first and second thin films through the use of the product (Model No. Keithley 2400) of Keithley Instruments™ as a source meter, measuring current of the first and second thin films from the corresponding voltage, and then converting the measured current to electrical resistance (R=V/I). In this case, in order to reduce the contact resistance between the first and second thin films and a metal probe that measures the current, a metal thin film with a thickness of 100 nm was formed in some areas of the first and second thin films, and the current was measured by contacting the metal thin film with the metal probe.

The resistance according to the temperature for the first cycle of the first and second thin films is illustrated in FIG.

Figure 5:
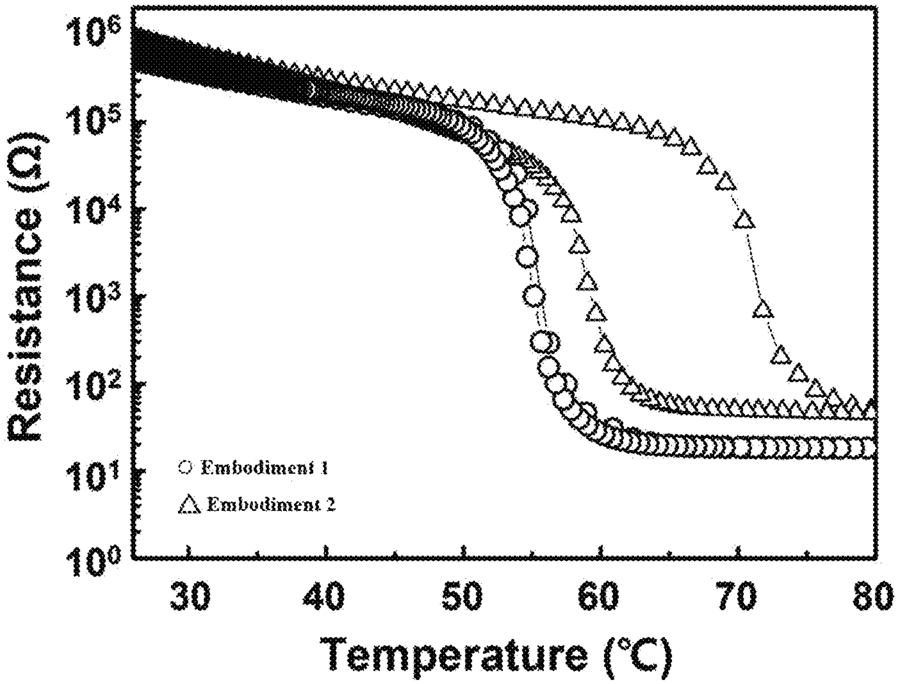
FIG. 5 is a graph representing resistance according to temperature during a first cycle in Experimental examples 1 and 2.
Figure 6:
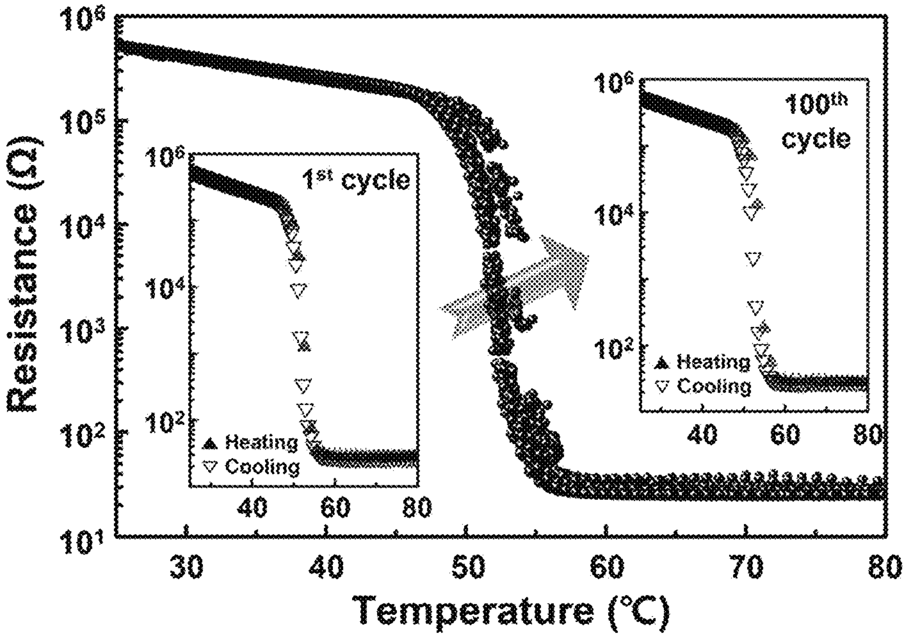
FIG. 6 is a graph representing resistance according to temperature during plural cycles in Experimental example 1.
Figure 7:
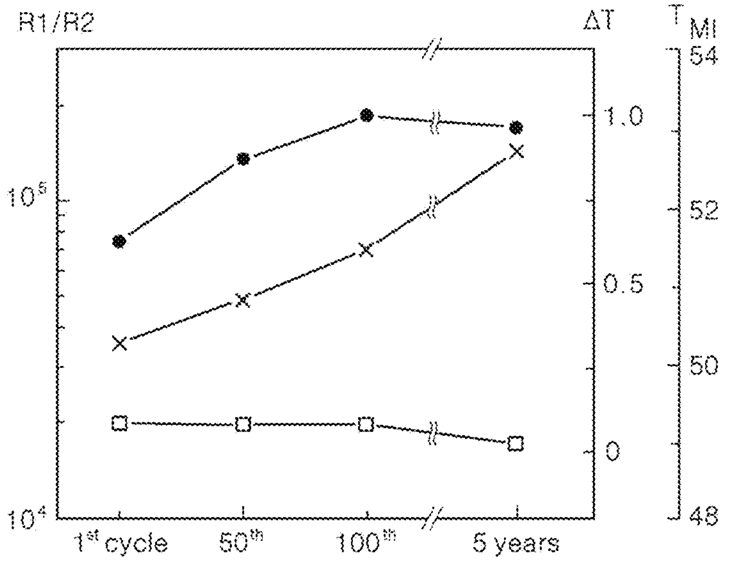
FIG. 7 is a graph representing changes of R1/R2 in Experimental example 1, hysteresis temperature difference (ΔT) of Experimental example 1, and phase transition temperature (TMI) of Experimental example 1 according to thermal cycle accumulation.

5. In FIG. 5, the first thin film is indicated as "o", and the second thin film is indicated as "Δ". The resistance according to the temperature during multiple cycles of the first thin film is illustrated in FIG. 6. FIG. 7 is a graph in which X-axis represents the number of thermal cycles, and Y-axis represents R1/R2 of the first thin film, the hysteresis temperature difference (ΔT), and the phase transition temperature ($T_{MI}$). In FIG. 7, "□" represents R1/R2, "X" represents the hysteresis temperature difference (ΔT, unit is ° C.), and "•" represents the phase transition temperature ($T_{MI}$, unit is ° C.).

In Table 1, based on FIG. 5, in the first cycle, the resistance R1 at 25° C. of the first and second thin films, the resistance R2 at 80° C., the temperature $T_H$ at which the absolute value of the temperature coefficient of resistance (TCR) is maximum in the heating process, the temperature $T_C$ at which the absolute value of the temperature coefficient of resistance (TCR) is maximum in the cooling process, R1/R2, the hysteresis temperature difference (ΔT), and the phase transition temperature ($T_{MI}$) are written.

TABLE 1

| | R1(Ω) | R2(Ω) | TH (° C.) | TC (° C.) | R1/R2 | ΔT (° C.) | TMI (° C.) |
|---|---|---|---|---|---|---|---|
| #1 | 5.257*105 | 2.631*102 | 52.427 | 52.370 | 19981 | 0.043 | 52.40 |
| #2 | 1.013*106 | 4.653*102 | 70.445 | 59.035 | 21778 | 11.41 | 64.74 |

Referring to Table 1, R1/R2 of the first and second thin films may be 19981 and 21778, which are more than equal to $10^4$. In consideration of the point that the ratio of the resistance of a typical temperature-sensitive resistive layer at 25° C. to the resistance thereof at 80° C. is several tens to several hundreds, the resistance change of the first and second thin films appears to be relatively larger than the resistance change of the typical temperature-sensitive resistive layer in the same temperature range. Accordingly, the electronic component using the first and second thin films may be capable of detecting the temperature more sensitively in comparison to the electronic component using the typical temperature-sensitive resistive layer. Referring to Table 1, the second thin film has the hysteresis temperature difference (ΔT) of 11.41° C., which exceeds 1° C. The first thin film has the hysteresis temperature difference (ΔT) of 0.043° C., which is less than or equal to 1° C. This means that the second thin film has a relatively large difference between the temperature in the heating process and the temperature in the cooling process with respect to the same resistance, whereas the first thin film has a relatively small difference therebetween. Accordingly, the electronic component using the first thin film may be capable of detecting the temperature more accurately in comparison to the electronic component using the second thin film. Referring to Table 1 and FIG. 5, it can be known that the maximum value of the temperature coefficient of resistance (TCR) of the first thin film is larger than the maximum value of the temperature coefficient of resistance (TCR) of the second thin film, and this indicates that the first thin film has a larger resistance change according to the temperature change in comparison to the second thin film. Accordingly, the sensitivity to the temperature change near the phase transition temperature ($T_{MI}$) of the first thin film may be higher than the sensitivity to the temperature change near the phase transition temperature ($T_{MI}$) of the second thin film.

Referring to Table 1, the phase transition temperature ($T_{MI}$) of the first thin film is relatively lower than the phase transition temperature ($T_{MI}$) of the second thin film. This means that the first thin film is transitioned from insulator to conductor at a relatively low temperature compared to the second thin film (metal-insulator transition). Accordingly, the electronic component using the first thin film may be used as a switching component at a relatively low temperature in comparison to the electronic component using the second thin film.

In Table 2, based on FIGS. 6 and 7, in each cycle of the first thin film, R1/R2, the hysteresis temperature difference (ΔT), the phase transition temperature ($T_{MI}$), the change ($V_{\Delta T}$) of the hysteresis temperature difference (ΔT) for 10 cycles, and the change rate ($V_{R1/R2}$) of R1/R2 for 10 cycles are written.

Meanwhile, in Table 2, for example, based on the interval from the first cycle to the tenth cycle, the change ($V_{\Delta T}$) of the hysteresis temperature difference (ΔT) for 10 cycles means a difference between the hysteresis temperature difference (ΔT) of the first cycle that is the first cycle of the corresponding interval and the hysteresis temperature difference (ΔT) of the tenth cycle that is the last cycle of the corresponding interval ($V_{\Delta T}=|\Delta T1-\Delta T10|$). This is applied in the same manner even to the change ($V_{TMI}$) of the phase transition temperature ($T_{MI}$) for 10 cycles. In addition, in Table 2, for example, based on the interval from the first cycle to the tenth cycle, the change rate ($V_{R1/R2}$) of R1/R2 for 10 cycles means a percentage of a difference between the R1/R2 value ($(R1/R2)_1$) of the first cycle that is the first cycle of the corresponding interval and the R1/R2 value ($(R1/R2)_{10}$) of the tenth cycle that is the last cycle of the corresponding interval with respect to the R1/R2 value ($(R1/R2)_1$) of the first cycle that is the first cycle of the corresponding interval ($V_{R1/R2}=100*(|(R1/R2)_1-(R1/R2)_{10}|)/(R1/R2)_1$).

Further, in the following description of Table 2, explanation will be made in a state where the intervals are divided into a first interval from the first cycle to the 10th cycle, a second interval from the 11th cycle to the 20th interval, a third interval from the 21st cycle to the 30th cycle, a fourth interval from the 31st cycle to the 40th cycle, and a fifth interval from the 41st cycle to the 50th cycle.

TABLE 2

| | R1/R2 | ΔT (° C.) | $T_{MI}$ (° C.) | $V_{\Delta T}$ (° C.) | $V_{TMI}$ (° C.) | $V_{R1/R2}$ (%) |
|---|---|---|---|---|---|---|
| $1^{st}$ | 19981 | 0.043 | 52.40 | — | — | — |
| $10^{th}$ | 19849 | 0.347 | 52.54 | 0.304 | 0.14 | 0.66 |
| $11^{th}$ | 19754 | 0.349 | 52.50 | — | — | — |
| $20^{th}$ | 19811 | 0.100 | 52.70 | 0.249 | 0.249 | 0.29 |
| $21^{th}$ | 19798 | 0.162 | 52.32 | — | — | — |
| $30^{th}$ | 19706 | 0.492 | 52.75 | 0.330 | 0.43 | 0.46 |
| $31^{th}$ | 19620 | 0.569 | 52.15 | — | — | — |
| $40^{th}$ | 19785 | 0.372 | 52.71 | 0.197 | 0.56 | 0.84 |
| $41^{th}$ | 19906 | 0.220 | 52.53 | — | — | — |
| $50^{th}$ | 19650 | 0.456 | 53.13 | 0.236 | 0.60 | 1.28 |
| $100^{th}$ | 19714 | 0.636 | 53.46 | — | — | — |

Referring to Table 2, the change ($V_{\Delta T}$) of the hysteresis temperature difference (ΔT) for 10 cycles of the first thin film is 0.304° C. in case of the first interval, 0.249° C. in case of the second interval, 0.330° C. in case of the third interval, 0.197° C. in case of the fourth interval, and 0.236° C. in case of the fifth interval. That is, it can be seen that the first thin film has a substantially constant hysteresis temperature difference (ΔT) regardless of the intervals because the change ($V_{\Delta T}$) of the hysteresis temperature difference (ΔT) for 10 cycles is less than or equal to 1° C. at all of the first to fifth intervals. As a result, the first thin film may be capable of detecting the accurate energy change repeatedly and stably within the temperature range in the heating and cooling processes. Referring to Table 2, the change ($V_{TMI}$) of the phase transition temperature ($T_{MI}$) for 10 cycles of the first thin film is 0.14° C. in case of the first interval, 0.249° C. in case of the second interval, 0.43° C. in case of the third interval, 0.56° C. in case of the fourth interval, and 0.60° C. in case of the fifth interval. That is, it can be seen that the first thin film has a substantially constant phase transition temperature ($T_{MI}$) regardless of the intervals because the change ($V_{TMI}$) of the phase transition temperature ($T_{MI}$) for 10 cycles is less than or equal to 1.5° C. at all of the first to fifth intervals. As a result, the first thin film may be capable of exhibiting a switching function at substantially the same temperature repeatedly and stably within the temperature range in the heating and cooling processes. Referring to Table 2, the change rate ($V_{R1/R2}$) of R1/R2 for 10 cycles of the first thin film is 0.66% in case of the first interval, 0.29% in case of the second interval, 0.46% in case of the third interval, 0.84% in case of the fourth interval, and 1.28% in case of the fifth interval. That is, it can be seen that the first thin film has a substantially constant R1/R2 value regardless of the intervals because the change rate ($V_{R1/R2}$) of R1/R2 for 10 cycles is less than or equal to 5% at all of the first to fifth intervals. As a result, the first thin film may be capable of detecting a sensitive energy change repeatedly and stably within the temperature range of the heating and cooling processes. Meanwhile, in the above, based on the first to fifth intervals, that is, based on the first to 50th cycles, the change rate ($V_{R1/R2}$) of R1/R2 for 10 cycles of the first thin film, the change ($V_{\Delta T}$) of the hysteresis temperature difference ($\Delta T$) for 10 cycles of the first thin film, and the change ($V_{TMI}$) of the phase transition temperature ($T_{MI}$) for 10 cycles of the first thin film have been explained, but this explanation is merely exemplary, and the scope of the present disclosure is not limited by the contents described above. That is, referring to FIG. 7, it can be known that, even in any 10 cycles which do not correspond to each of the first to fifth intervals (e.g., 10 cycles from the third cycle to the 12th cycle) within the first to 50th cycles, the first thin film has the change rate ($V_{R1/R2}$) of R1/R2 for 10 cycles, the change ($V_{\Delta T}$) of the hysteresis temperature difference ($\Delta T$) for 10 cycles, and the change ($V_{TMI}$) of the phase transition temperature ($T_{MI}$) for 10 cycles. Further, referring to FIG. 7, it can be known that, even in cycles after the 50th cycle, the first thin film has the change rate ($V_{R1/R2}$) of R1/R2 for 10 cycles, the change ($V_{\Delta T}$) of the hysteresis temperature difference ($\Delta T$) for 10 cycles, and the change ($V_{TMI}$) of the phase transition temperature ($T_{MI}$) for 10 cycles.

Figure 8:
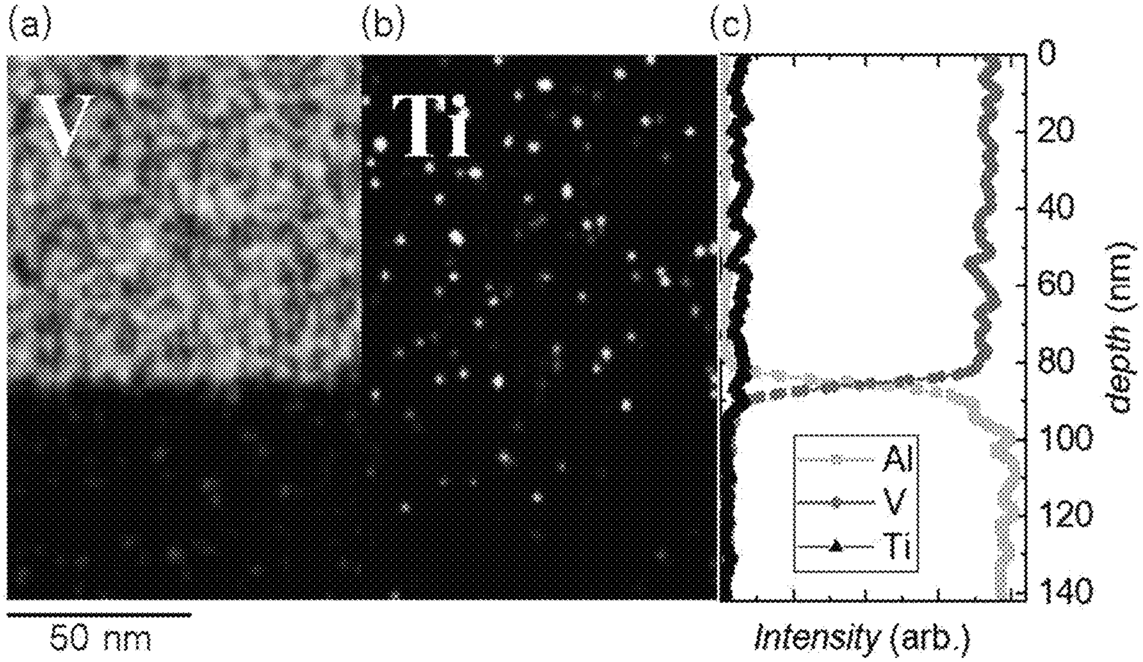
FIG. 8 is a diagram illustrating energy-dispersive X-ray spectroscopy (EDX) data using a transmission electron microscope (TEM) for a body according to an embodiment.

Example of Experimental Data Analysis for Doping Uniformity in Functional Thin Film FIG. 8 illustrates energy-dispersive X-ray spectroscopy (EDX) data using a transmission electron microscope (TEM) for a body according to an embodiment. In FIG. 8, (a) represents data in which the mapping result for V is visualized, (b) represents data in which the mapping result for Ti is visualized, and (c) represents an EDX curve graph showing the mapping results for respective components Al, V, and Ti with the horizontal axis representing intensity and the vertical axis representing depth of test pieces. In the drawing, the depth is a scale for the thickness of a body, and the value of depth 0 may be close to the surface of the body and the value of depth 140 may be close to the bottom surface of the body. For example, in the drawing, the depth range of 0 nm to 90 nm may correspond to the above-described functional thin film, and the depth range of 90 nm to 140 nm may correspond to the base substrate. As described above, the base substrate is a sapphire ($Al_2O_3$) single crystal substrate, and the functional thin film is formed by replacing (doping) at least some of V ions of a $VO_2$ crystal lattice with Ti ions.

As illustrated in the drawing, it can be confirmed that Ti is uniformly dispersed on the functional thin film after heat treatment. Before the heat treatment, the functional thin film exists as the $TiO_2$ thin film (with a thickness of 3 nm to 5 nm) and the $VO_2$ thin film (with a thickness of 200 nm to 300 nm), and after the heat treatment, as illustrated in the drawing, Ti is uniformly distributed in the depth range of 0 nm to 90 nm. As a result, this means that Ti is uniformly dispersed on the functional thin film. This shows that Ti spreads to and reaches the surface through the entire functional thin film in a thickness direction, and represents the uniformity of doping according to an embodiment.

That is, as illustrated in the drawing, in the depth range of 0 nm to 90 nm, the EDX curve of Ti is maintained substantially constantly, and this value shows a clearer difference in comparison to the value on the EDX curve of Al.

Hereinafter, the uniformity of doping within the functional thin film will be described in more detail.

Referring to FIG. 8 continuously, it can be known that V and Ti have a similar distribution level (standard deviation). This shows the uniformity of doping more clearly. That is, it is shown that Ti is uniformly distributed as much as V in the $VO_2$ thin film. This shows that the boundaries between the sacrificial layer and the main oxide layer disappear after the post heat treatment process according to an embodiment. This will be described later with reference to FIGS. 9 and 10.

Figure 9:
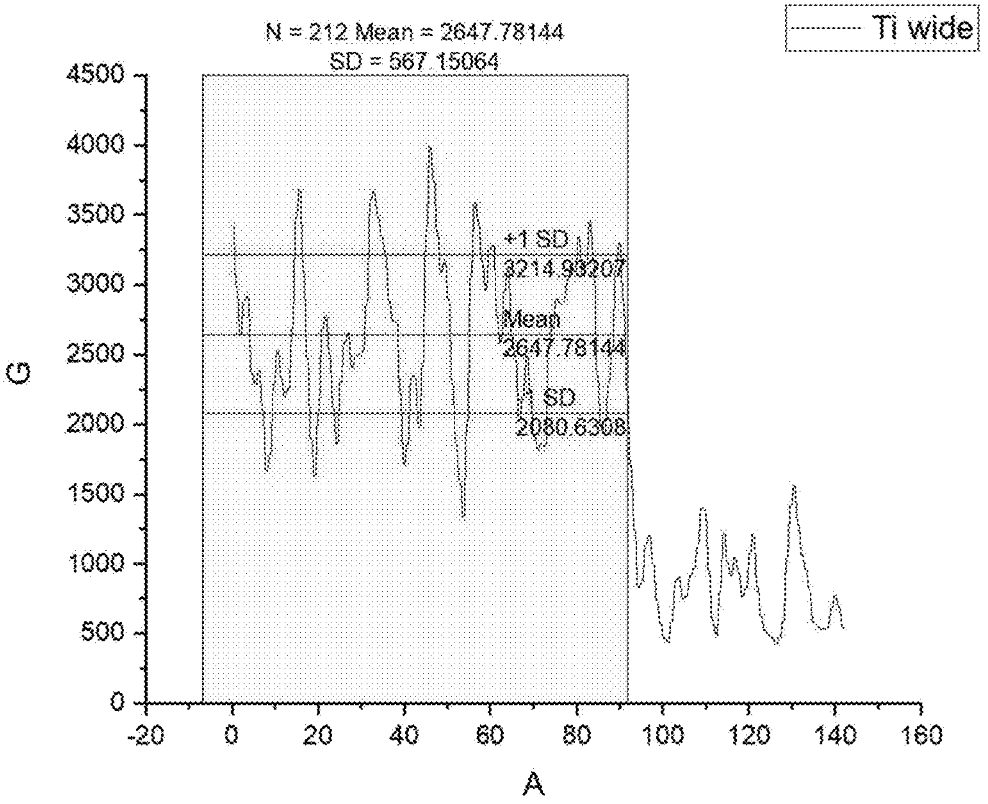
FIG. 9 is a diagram illustrating only Ti of the EDX curve in FIG. 8 in an enlarged manner.
Figure 10:
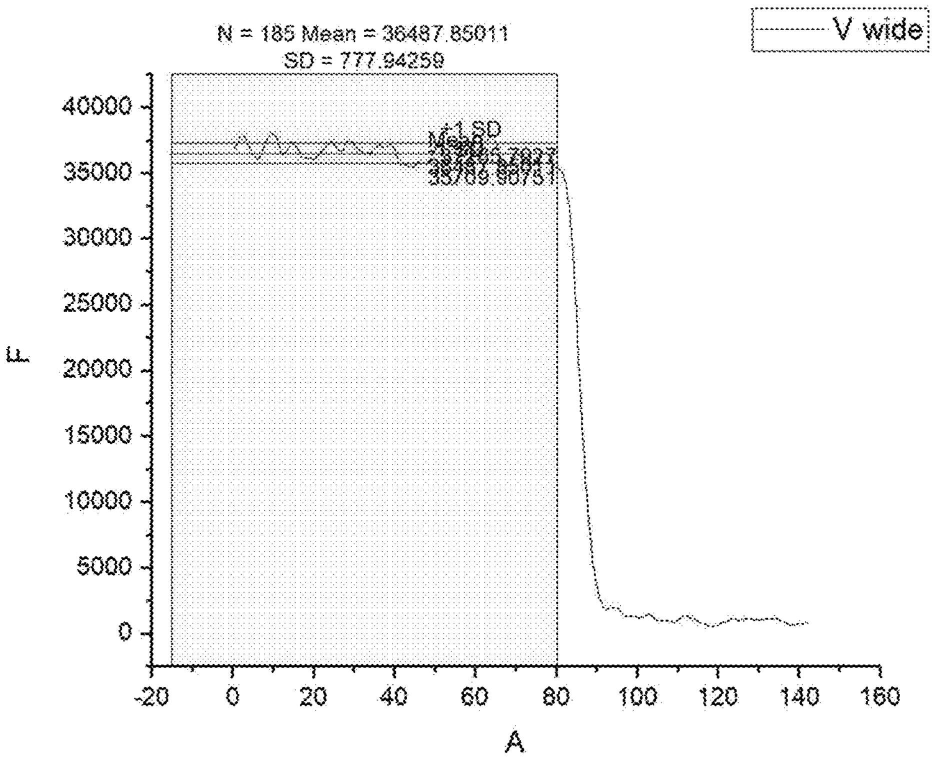
FIG. 10 is a diagram illustrating only V of the EDX curve in FIG. 8 in an enlarged manner.

FIG. 9 illustrates only the mapping result for Ti of the EDX curve of FIG. 8 in an enlarged manner. In the range of 0 nm to 90 nm, an average (about 2647) and standard deviation (about 567) were obtained. Further, FIG. 10 illustrates only the mapping result for V of the EDX curve of FIG. 8 in an enlarged manner. In the range of 0 nm to 90 nm, an average (about 36487) and standard deviation (about 778) were obtained. In this case, it may be noted that although the intensity itself has no meaning by setting the y axis arbitrarily, the standard deviation for Ti and the standard deviation for V can be compared with each other. That is, it may be noted that comparative data on whether Ti is uniformly distributed as much as V in the functional thin film is presented.

As illustrated in the drawing, Ti corresponding to a dissimilar metal element and V of $VO_2$ which forms the main oxide layer, may have similar distribution levels. That is, Ti may be uniformly distributed as much as V in the functional thin film. For example, the distribution level of Ti corresponding to the dissimilar metal element may have a difference of less than or equal to 30% compared to the distribution level of V of $VO_2$ constituting the main oxide layer. More specifically, since the value obtained by dividing a difference (211) of the two standard deviations by the EDX of V (778) is 0.271, the distribution level of Ti may have a difference of less than or equal to 27.1%. In this case, for the convenience of calculation, the decimal places have been appropriately handled by rounding up or rounding down, but for more accurate calculation, even the decimal places may also be considered.

In the above, the TEM-EDX result has been described from the viewpoint of the distribution level of the intensity, but in case of converting the intensity into an average concentration, the approach may also be made from the viewpoint of the distribution level of the average concentration instead of the intensity.

Figure 11:
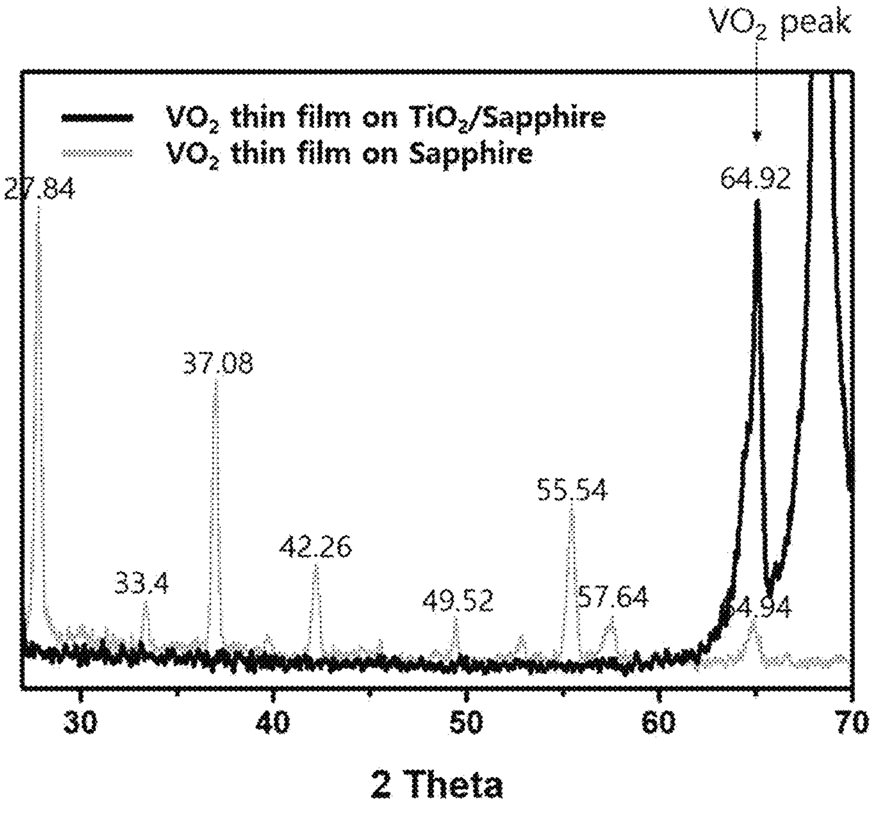
FIG. 11 is a diagram illustrating X-ray diffraction (XRD) data for a body according to an embodiment.

Example of Experimental Data Analysis for High Crystallinity in Functional Thin Film FIG. 11 illustrates X-ray diffraction (XRD) data for a body according to an embodiment. The XRD shows the crystallinity of the entire thin film. As illustrated in the drawing, $VO_2$ that is grown on $TiO_2$ has only one main $VO_2$ peak (refer to a part indicated by an arrow in the drawing) after the heat treatment.

That is, the XRD peak of the main $VO_2$ does not appear in the range of 2θ=20~60°, and appears only in the range of 2θ=60~70°. This shows that $VO_2$ is a thin film having high crystallinity (epitaxial thin film). On the other hand, if $VO_2$ is grown independently, several main peaks appear, and thus it can be known that $VO_2$ is a polycrystal thin film.

More specifically, in the X-ray diffraction pattern measured by the XRD, $VO_2$ grown on $TiO_2$ has one peak A that appears in the range of 2θ=64.92±0.5°, whereas $VO_2$ grown independently without $TiO_2$ has total 8 peaks a1, b1, c1, d1, e1, f1, g1, and h1 in order, which appear in a range of 2θ=27.84±0.5°, a range of 2θ=33.4±0.5°, a range of 2θ=37.08±0.5°, a range of 2θ=42.26±0.5°, a range of 2θ=49.52±0.5°, a range of 2θ=55.54±0.5°, a range of 2θ=57.64±0.5°, and a range of 2θ=64.94±0.5°. The single peak A means an epitaxial thin film, and the several peaks a1, b1, c1, d1, e1, f1, g1, and h1 mean the polycrystal thin film.

In this case, the peak A may have a full width at half maximum (FWHM) of less than or equal to 1.0°. Preferably, the peak A may have an FWHM of less than or equal to 0.79°. This supports high crystallinity in the functional thin film according to an embodiment.

Meanwhile, on the point that fine peaks may appear on the XRD data, in the present disclosure, the term "main $VO_2$ peak" may target only a peak above a predetermined intensity. As an example, the peaks that do not exceed 10% of the maximum peak intensity are not considered. That is, if the intensity of the peak A is 632.68, the peaks having the intensity of less than or equal to 63.27 may not be considered.

In the above, the explanation has been made based on the embodiments in which 8 peaks appear, but the number of peaks is not necessarily limited thereto, and embodiments, in which the number of peaks, showing the polycrystal, is smaller than or larger than 8, are also possible. It is necessarily notable that in case of the epitaxial thin film, only one main peak may appear, whereas in case of the polycrystal thin film, several main peaks may appear.

The functional thin film according to an embodiment shows that the main oxide layer is influenced by the crystal structure of the sacrificial layer and is crystallized with high directivity, and the metal ions of the sacrificial layer are doped into the entire main oxide layer through self-spreading, and even after the doping, the crystal structure of the main oxide layer is maintained in the original state. That is, in spite of the doping of the dissimilar metal elements, the crystal structure of the main oxide can be maintained.

As described above, it can be known that according to the functional thin film according to an embodiment, the boundaries between the sacrificial layer and the main oxide layer disappear after the post heat treatment process, the crystal structure of the main oxide layer is maintained before and after the doping, and high crystal thin film in the form in which sacrificial layer metal ions are doped into the entire functional thin film can be formed.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An oxide thin film comprising:

a single crystal substrate; and a $VO_2$ layer laminated on the single crystal substrate and doped with Ti, wherein a $VO_2$ XRD peak of the $VO_2$ layer does not appear in a range of 2θ=20° to 60°, but appears only in a range of 2θ=60° to 70°.

2. The oxide thin film of claim 1, wherein the $VO_2$ layer is not defined as a poly-crystal thin film in which multiple main $VO_2$ XRD peaks that satisfy more than a predetermined intensity appear in a range of 2θ=20° to 70°, but is defined as a high-crystal epitaxial thin film in which one main $VO_2$ XRD peak appears.

3. The oxide thin film of claim 2, wherein the poly-crystal thin film is made so that the main $VO_2$ XRD peak appears in two or more of a range of 2θ=27.84±0.5°, a range of 2θ=33.4±0.5°, a range of 2θ=37.08±0.5°, a range of 2θ=42.26±0.5°, a range of 2θ=49.52±0.5°, a range of 2θ=55.54±0.5°, a range of 2θ=57.64±0.5°, and a range of 2θ=64.94±0.5°, whereas the epitaxial thin film is made so that the main $VO_2$ XRD peak appears only in a range of θ=64.92±0.5°.

4. The oxide thin film of claim 2, wherein a half width at half maximum (HWHM) of the main $VO_2$ XRD peak of the $VO_2$ layer is less than or equal to 1°.

* * * * *